United States Patent
Itkin et al.

(10) Patent No.: US 10,972,140 B2
(45) Date of Patent: Apr. 6, 2021

(54) ADJUSTING PARAMETERS OF A RECEIVER SYSTEM

(71) Applicant: INTEL IP CORPORATION, Santa Clara, CA (US)

(72) Inventors: Grigory Itkin, Munich (DE); Stefan Helmut Schmalzl, Sauerlach (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/490,011

(22) PCT Filed: Mar. 31, 2017

(86) PCT No.: PCT/US2017/025597
§ 371 (c)(1),
(2) Date: Aug. 29, 2019

(87) PCT Pub. No.: WO2018/182739
PCT Pub. Date: Oct. 4, 2018

(65) Prior Publication Data
US 2020/0244294 A1   Jul. 30, 2020

(51) Int. Cl.
*H04B 1/10* (2006.01)
*H04B 17/21* (2015.01)
(Continued)

(52) U.S. Cl.
CPC ............ *H04B 1/1027* (2013.01); *H04B 1/16* (2013.01); *H04B 17/0085* (2013.01); *H04B 17/21* (2015.01); *H04B 2001/1072* (2013.01)

(58) Field of Classification Search
CPC ........ H04B 1/1027; H04B 17/21; H04B 1/16; H04B 17/0085; H04B 2001/1072
(Continued)

(56) References Cited

U.S. PATENT DOCUMENTS 7,120,407 B2 *  10/2006  Miyagi ................... H03J 1/005
                                                    455/169.1
7,286,804 B2 *  10/2007  Miyagi ................... H03J 1/005
                                                    455/169.1
(Continued)

FOREIGN PATENT DOCUMENTS

WO   2010/056736 A2   5/2010

OTHER PUBLICATIONS

International Search Report and Written Opinion dated Dec. 10, 2017, on Application No. PCT/US2017/025597.
(Continued)

*Primary Examiner* — Sonny Trinh
(74) *Attorney, Agent, or Firm* — Schwegman, Lundberg & Woessner, P.A.

(57) ABSTRACT

An apparatus for adjusting a component in a receiver system to eliminate distortion. The apparatus may include a receiver system and a tuning circuit. The receiver system may process a tracking signal to generate an output signal. The tracking signal may include a radio frequency (RF) signal and a test signal. The processing of the first tracking signal may introduce a distortion into the output signal. The tuning circuit may be operatively coupled to the receiver system. The tuning circuit may determine an adjustment value and send the adjustment value to the receiver system. The receiver system may adjust a component of the receiver system using the adjustment value to eliminate the distortion in a second RF signal that is caused by the component.

20 Claims, 6 Drawing Sheets

(51) Int. Cl.
*H04B 1/16* (2006.01)
*H04B 17/00* (2015.01)

(58) Field of Classification Search
USPC .................................................. 455/24, 195.1
See application file for complete search history.

(56) References Cited

U.S. PATENT DOCUMENTS

| | | | | |
|---|---|---|---|---|
| 8,862,084 | B2 * | 10/2014 | Carlsson | H04B 17/336 |
| | | | | 455/226.1 |
| 8,971,874 | B2 * | 3/2015 | Han | H04W 24/06 |
| | | | | 455/425 |
| 8,981,786 | B2 * | 3/2015 | Oshima | G11C 29/56012 |
| | | | | 324/537 |
| 9,967,762 | B2 * | 5/2018 | Kennedy | H04W 24/06 |
| 10,218,070 | B2 * | 2/2019 | Greene | H04B 1/0458 |
| RE47,412 | E * | 5/2019 | Greene | H03H 7/40 |
| 2005/0260962 | A1 | 11/2005 | Nazrul et al. | |
| 2013/0303098 | A1 | 11/2013 | Carlsson et al. | |
| 2015/0333850 | A1 | 11/2015 | Myoung et al. | |
| 2016/0269060 | A1 | 9/2016 | Salfelner | |

OTHER PUBLICATIONS

"International Application Serial No. PCT/US2017/025597, International Preliminary Report on Patentability dated Oct. 10, 2019", 10 pgs.

* cited by examiner

ADJUSTING PARAMETERS OF A RECEIVER SYSTEM

BACKGROUND

The disclosure relates to the field of wireless communications, including adjusting the parameters of a signal received at a device.

BRIEF DESCRIPTION OF THE DRAWINGS

Various exemplary implementations of the present disclosure will be understood more fully from the detailed description given below and from the accompanying drawings of various exemplary implementations of the disclosure.

DETAILED DESCRIPTION

In the following description, various aspects of the illustrative exemplary implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials, and configurations are set forth in order to provide a thorough understanding of the illustrative exemplary implementations. However, it will be apparent to one skilled in the art that the present disclosure may be practiced without the specific details. In other instances, well-known features are omitted or simplified in order not to obscure the illustrative exemplary implementations.

Radio communication systems rely upon radio frequency signals to communicate data between devices. The quality of a signal received by a device may depend upon a strength of the signal relative to system noise and signal degradation. The system noise and signal degradation may be introduced into the signal by circuitry at a transmitter, while the signal is transmitted between the devices, or by circuitry at a receiver. For example, circuitry at the receiver may introduce noise and interference as the signal is received and processed.

A correction of the interference may be complicated by there being several different potential causes of the interference, where different causes of interference may have different solutions. For example, an amplitude modulation (AM) radio receiver can introduce noise into a signal as the signal is processed by a mixer or an amplifier. The distortions or interference in the signal may be caused by imperfections in components or circuitry of the receiver that are dependent on external variables. The external variables may include a temperature of the component (such as an operating temperature) a supply voltage level, a humidity level, an age of the component, or external radiation, imperfections in the components or circuitry of the receiver, and so forth.

Conventional receivers may be factory calibrated to adjust for different defined settings, such as the receiver operating at different temperatures. For example, reception parameters may be measured and calibrated for during a design phase or factory calibration of the receiver. However, as communication devices are used in increasingly different environments and under a growing number of conditions, the design phase and factory calibration may not be able to test for all the environments and conditions to calibrate for the noise and interference. For example, calibrating a receiver once at a factory at constant temperature using dedicated test signals with defined parameters does not allow tracking parameters over extended periods of time or under changing environments.

The present disclosure addresses the above-mentioned and other deficiencies by providing a system to adjust parameters of a receiver to remove impairments, such as distortions and interference, in a signal caused by circuits or other components of the receiver. The parameters may be measured and tracked while the system processes a received signal. The impairments may be measured and tracked continuously over a period of time. The system may adjust the circuits or other components of the receiver to account for the impairments in the signal while a device is operating and before passing the signal to a processor. For example, the system may tune parameters of components in the system during an operation of a radio device without degrading a performance of the radio device. The adjustment of the signal may increase a quality of a received signal and increase an efficiency of the device.

Figure 1:
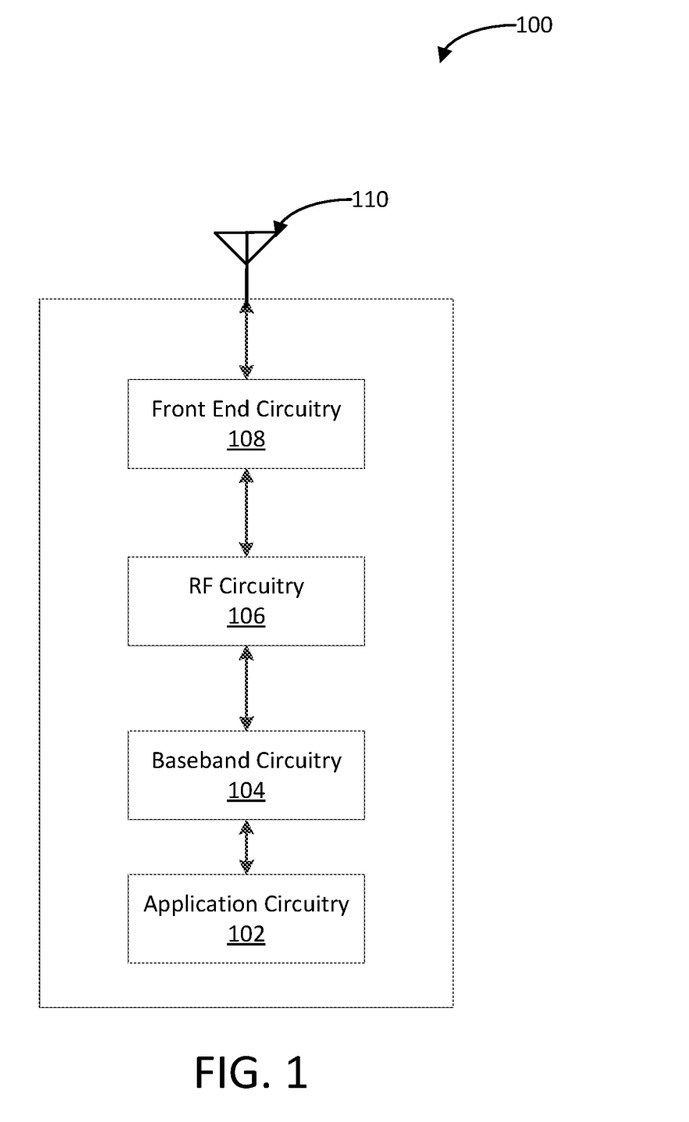
FIG. 1 is a block diagram illustrating exemplary components of an electronic device implementing aspects of the disclosure, according to an exemplary implementation.

Exemplary implementations described herein may be implemented into a system using any suitably configured hardware and/or software. FIG. 1 illustrates, for one exemplary implementation, a block diagram of example components of a mobile device 100. In some exemplary implementations, the mobile device 100 may include application circuitry 102, baseband circuitry 104, Radio Frequency (RF) circuitry 106, front-end circuitry 108, and one or more antennas 110, coupled together at least as shown. The front-end circuitry 108, baseband circuitry 104, RF circuitry 106 may use a digital-to-time conversion (DTC) system to generate clock signals, perform phase modulation, or perform other functions to enable wireless connectivity. While the digital-to-time conversion systems described herein may be suited for use in a mobile device as shown, though, the DTC system may also be used in other computing systems that generate clock signals, modulate signals, or use a DTC system for other purposes.

In the mobile device 100, the application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage element and may be configured to execute instructions stored in the storage element to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband circuitry 104 may interface with the application circuitry 102 for generation and processing of the baseband signals and for controlling operations of the RF circuitry 106. For example, in some exemplary implementations, the baseband circuitry 104 may include a second generation (2G) baseband processor, a third generation (3G) baseband processor, a fourth generation (4G) baseband processor, and/or other baseband processor(s) for other existing generations, generations in development, or to be developed in the future (e.g., fifth generation (5G), 6G, or the like). The baseband circuitry 104 may handle various radio control functions that enable communication with one or more radio networks via the RF circuitry 106. The radio control functions may include, but are not limited to, signal modulation/demodulation, encoding/decoding, radio frequency shifting, etc. In some exemplary implementations, the baseband circuitry 104 may determine a channel or frequency for uplink or downlink communications based on messages received from the network. The baseband circuitry 104 may instruct the RF circuitry 106 to monitor particular channels or frequencies as well as to transmit on particular channels or frequencies.

In some exemplary implementations, the baseband circuitry 104 may generate clock signals or perform phase modulation using a DTC system. Accordingly, the baseband circuitry 104 may include a DTC system that determines the phase output of a DTC system in response to DTC system inputs.

In some exemplary implementations, modulation/demodulation circuitry of the baseband circuitry 104 may include Fast-Fourier Transform (FFT), preceding, and/or constellation mapping/demapping functionality. In some exemplary implementations, encoding/decoding circuitry of the baseband circuitry 104 may include convolution, tail-biting convolution, turbo, Viterbi, and/or Low Density Parity Check (LDPC) encoder/decoder functionality. Exemplary implementations of modulation/demodulation and encoder/decoder functionality are not limited to these examples and may include other suitable functionality in other exemplary implementations.

In some exemplary implementations, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) of the baseband circuitry 104 may be configured to run elements of the protocol stack for signaling of the PHY, MAC, RLC, PDCP, NAS and/or RRC layers. In some exemplary implementations, the baseband circuitry may include one or more audio digital signal processor(s) (DSP). The audio DSP(s) may include elements for compression/decompression and echo cancellation and may include other suitable processing elements in other exemplary implementations. Components of the baseband circuitry may be suitably combined in a single chip, a single chipset, or disposed on a same circuit board in some exemplary implementations. In some exemplary implementations, some or all of the constituent components of the baseband circuitry 104 and the application circuitry 102 may be implemented together such as, for example, on a system on a chip (SoC).

In some exemplary implementations, the baseband circuitry 104 may provide for communication compatible with one or more radio technologies. For example, in some exemplary implementations, the baseband circuitry 104 may support communication with an evolved universal terrestrial radio access network (EUTRAN) and/or other wireless metropolitan area networks (WMAN), a wireless local area network (WLAN), a wireless personal area network (WPAN). Exemplary implementations in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various exemplary implementations, the RF circuitry 106 may include switches, filters, amplifiers, etc. to facilitate the communication with the wireless network. RF circuitry 106 may include a receive signal path which may include circuitry to down-convert RF signals received from the front-end circuitry 108 and provide baseband signals to the baseband circuitry 104. RF circuitry 106 may also include a transmit signal path which may include circuitry to up-convert baseband signals provided by the baseband circuitry 104 and provide RF output signals to the front-end circuitry 108 for transmission.

In some exemplary implementations, the RF circuitry 106 may generate clock signals or perform modulation. Accordingly, the RF circuitry 106 may include a DTC system that determines the phase output of a DTC in response to DTC inputs.

Front-end circuitry 108 may include a receive signal path which may include circuitry configured to operate on RF signals received from one or more antennas 110, amplify the received signals and provide the amplified versions of the received signals to the RF circuitry 106 for further processing. Front-end circuitry 108 may also include a transmit signal path which may include circuitry configured to amplify signals for transmission provided by the RF circuitry 106 for transmission by one or more of the one or more antennas 110.

In some exemplary implementations, the front-end circuitry 108 may include a TX/RX switch to switch between transmit mode and receive mode operation. In another embodiment, the front-end circuitry 108 may include a duplex-filter to separate receive signals and transmit signals. The front-end circuitry 108 may include a receive signal path and a transmit signal path. The receive signal path of the front-end circuitry 108 may include a low-noise amplifier (LNA) to amplify received RF signals and provide the amplified received RF signals as an output (e.g., to the RF circuitry 106). The transmit signal path of the front-end circuitry 108 may include a power amplifier (PA) to amplify input RF signals (e.g., provided by RF circuitry 106), and one or more filters to generate RF signals for subsequent transmission (e.g., by one or more of the one or more antennas 110).

In some exemplary implementations, the front-end circuitry 108 may generate clock signals or perform modulation (using a DTC system). The mobile device 100 may include components as described with reference to FIGS. 2 and 4 below to perform operations as described with reference to FIG. 6. For example, the system 200 in FIG. 2 may be part of the front end circuitry 108 and the RF circuitry 106.

Figure 2:
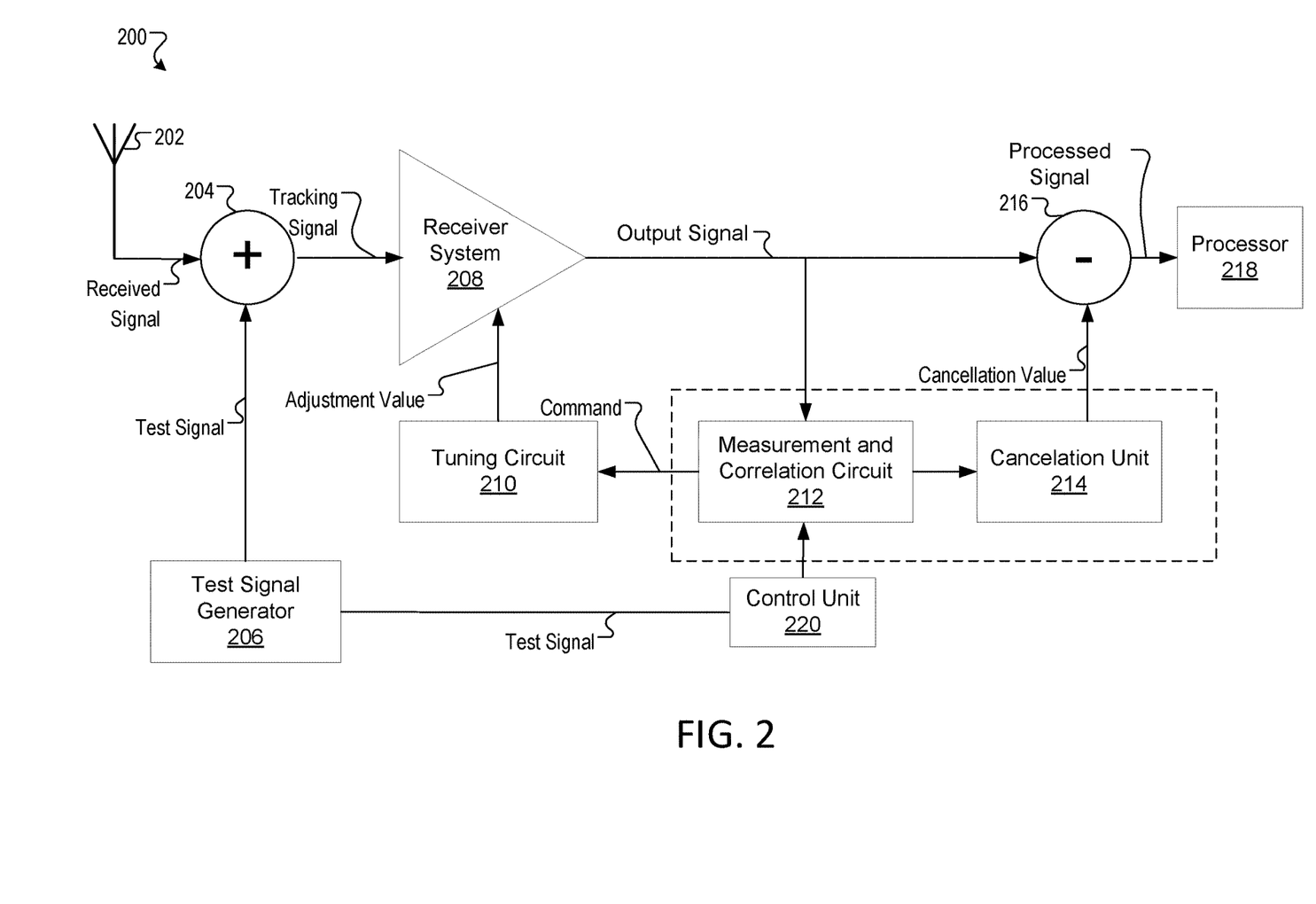
FIG. 2 illustrates a system to adjust a signal received at a radio device, according to one exemplary implementation.

FIG. 2 illustrates a system 200 to adjust a signal received at a radio device, according to one exemplary implementation. The system 200 may include an antenna 202, a combiner 204, a test signal generator 206, a receiver system 208, a tuning circuit 210, a measurement and correlation circuit 212, a cancellation circuit 214, an adjustment circuit 216 and a control unit 220.

The system 200 may be a preprocessing unit that is part of a receiver of a radio device. The radio device may be used in a smartphone, a tablet device, a computing device, a telephone, a walkie-talkie, a machine-to-machine communication module, a wifi-router, a cellular base station, and so forth. In one implementation, the system 200 may be a preprocessing unit that receives a signal and processes the signal before the signal is sent to the processor 218 for digital processing. For example, the antenna 202 may part of a smartphone that receives a signal from a cellular base station. The received signal may be a signal that occupies a defined frequency range. The antenna 202 may be coupled to the combiner 204. The antenna 202 may send the received signal to the combiner 204. The test signal generator 206 may also be coupled to the combiner 204. The test signal generator 206 may generate a test signal with defined characteristics to test the impairments of the system 200. The defined characteristics may include a frequency(s), a phase(s), or an amplitude(s) of the signal(s). In one example, the test signal may be a dual tone signal associated with an input intercept point (IIP) 2 or AM signal associated with IIP 3 characteristic. In one example, the test signal generator 206 may generate a test signal at a signal frequency to test for an impairment in the system 200. In one exemplary implementation, the test signal generator 206 may generate a signal at a single tone or frequency to avoid cross-dependencies and interference between the multiple signals at different frequencies. In another exemplary implementation, the test signal generator 206 may generate test signals at different tones or frequencies to test for multiple impairments in the system 200. For example, a test signal associated with the IIP2 characteristics may be testing for interference from a mixer of the receiver system 208.

The test signal generator 206 may send the test signal to the combiner 204. The combiner 204 may combine the test signal with the received signal from the antenna to generate an input signal. The test signal may be generated and combined with the received signal while the system 200 or a device is in operation and running. The combiner 204 may be coupled to the receiver system 208. The combiner 204 may send the input signal to the receiver system 208.

The receiver system 208 may include a signal processor to process the input signal and an analog to digital converter (ADC) to convert an analog input signal to a digital output signal. Components of the receiver system 208 may deteriorate the input signal causing impairments. In one example, the variable impairments may include variances in the analog input signal due to different operating temperatures and variances in resistors and other components of the receiver system 208. The receiver system 208 may be coupled to the measurement and correlation circuit 212. The receiver system 208 may send the output signal to the measurement and correlation circuit 212.

The measurement and correlation circuit 212 may identify the impairments in the test signal by measuring the effect of the impairments on the test signal. The measurement and correlation circuit 212 may identify a change in the output signal at selected frequencies of the test signal to determine a change in the input signal caused by the receiver system 208. In one example, the change in the output signal at the defined frequencies may be a change in an amplitude of the signal at the defined frequency. In another example, the change in the output signal at the defined frequency may be a change in a phase of the signal at the defined frequency. In another exemplary implementation, the test signal may be a sinusoidal (SIN) signal or a cosine (COS) signal. The SIN signal or the COS signal may be a relatively simple signal with a unique form that may be identified by the measurement and correlation circuit 212 and canceled out by the cancellation circuit 214 and adjustment circuit 216, as discussed below. A type or form of the test signal in not intended to be limiting and other types or shapes of test signals may be used.

The measurement and correlation circuit 212 may generate a change value that indicates the change in the output signal at the defined frequency, such as a change in amplitude of the output signal at the defined frequency. The measurement and correlation circuit 212 may be coupled to the tuning circuit 210. The measurement and correlation circuit 212 may send the command to the tuning circuit 210. The tuning circuit may use the command to determine an adjustment to make to the receiver system 208 to compensate for impairments caused by the receiver system 208. In one example, the impairments may be interference in the input signal caused by a component of the receiver system 208.

In one exemplary implementation, the tuning circuit 210 may include a look-up table (LUT) that may include adjustment values for tunable parameters of the components of the receiver system 208 that are associated with different change values. The adjustment values may be a current level or a voltage level supplied to a component of the receiver system 208. For example, a first adjustment value may be associated with a tunable parameter of a radio frequency (RF) down conversion mixer. The tunable parameters may include a gate voltage or a bias current for the RF down-conversion mixer.

The tuning circuit 210 may be coupled to the receiver system 208 and may send an adjustment value to the receiver system 208. In one exemplary implementation, the receiver system 208 may adjust the tunable parameter of a component of the receiver system 208, such as the RF down conversion mixer, to reduce or eliminate the impairment caused by the RF down conversion mixer at the defined frequency of the output signal. In another exemplary implementation, the receiver system 208 may include a frequency shifter that may adjust the output signal to compensate for impairments caused by a component of the receiver system 208.

In another exemplary implementation, the adjustment value may be a baseline adjustment that the receiver system 208 makes to the component of the receiver system 208. The tuning circuit 210 may monitor subsequent output signals from the receiver system 208 to iteratively change the adjustment value and compensate for the impairment. For example, an initial adjustment value may decrease a gate voltage of the RF down conversion mixer by a defined amount. The decrease in the gate voltage of the RF down conversion mixer may reduce an interference level of the RF down conversion mixer by 90 percent. The tuning circuit 210 may then determine a second adjustment value in response to receiving a second command from the measurement and correlation circuit 212.

The tuning circuit 210 may then determine a second adjustment value to further decrease the gate voltage of the RF down conversion mixer to eliminate the interference caused by the RF down-conversion mixer. In one example, the second adjustment value may be a linear step value that is incremented by the same amount in each iteration. In another example, the second adjustment value may be a nonlinear value that may be a different value for each iteration. For example, a first nonlinear value may be a first value and a second nonlinear value may be a multiple or a fraction of the first value. In this example, the tuning circuit 210 may adjust the nonlinear values depending on an amount of distortions is removed in the output signal. When the reduction of distortions is below a threshold level, the second nonlinear value may be a multiple of the first nonlinear value. When the reduction of distortions is above a threshold level, the second nonlinear value may be a fraction of the first nonlinear value.

The tuning circuit 210 may then send the second adjustment value to the receiver system 208 and the receiver system 208 may adjust the RF down conversion mixer accordingly. In one example, the tuning circuit 210 may iteratively adjust the components of the receiver system 208 to reduce impairments and interference caused by the components.

The cancellation circuit 214 may determine a cancellation value to change an amplitude or/and the phase of the output signal at a given frequency to remove the test signal from the output signal. In one example, the cancellation value may be an amplitude value that is opposite in value to an increase an amplitude of the received signal when the received signal is combined with the test signal. For example, when the received signal is combined with the test signal, an amplitude of the resulting input signal may increase by 20 decibels (dB) at a frequency of 10 megahertz (MHz). The cancellation value may be a signal with an amplitude value for the cancellation circuit 214 to decrease the amplitude of the output signal by 20 dB at the 10 MHz frequency. In once example, the cancellation circuit 214 may be a Spur cancellation unit that implements a Spur cancellation technique.

The cancellation circuit 214 may be coupled to the adjustment circuit 216. The adjustment circuit 216 may increase or decrease an amplitude of the output signal at the given frequency by the cancellation value to generate a processed signal. In one example, when the cancellation value is 20 dB for 10 MHz, the adjustment circuit 216 may increase an amplitude of the output signal by 20 dB at 10 MHz. In another example, when the cancellation value is −10 dB for 10 MHz, the adjustment circuit 216 may decrease an amplitude of the output signal by 10 dB at 10 MHz. When the adjustment circuit 216 has generated the processed signal, the adjustment circuit 216 may send the processed signal to a processor 218. In one example, the processor 218 may be a signal processor that further processes the processed signal. In another example, the processor 218 may be a modem that demodulates the processed signal. In one exemplary implementation, the measurement and correlation circuit 212, the cancellation circuit 214, and the adjustment circuit 216 may be integrated into a single circuit.

The control unit 220 may be coupled to the test signal generator 206. The control unit 220 may send the start/stop command to begin and finish tuning process when for example the operational environment(s) is (are) changed.

Figure 3:
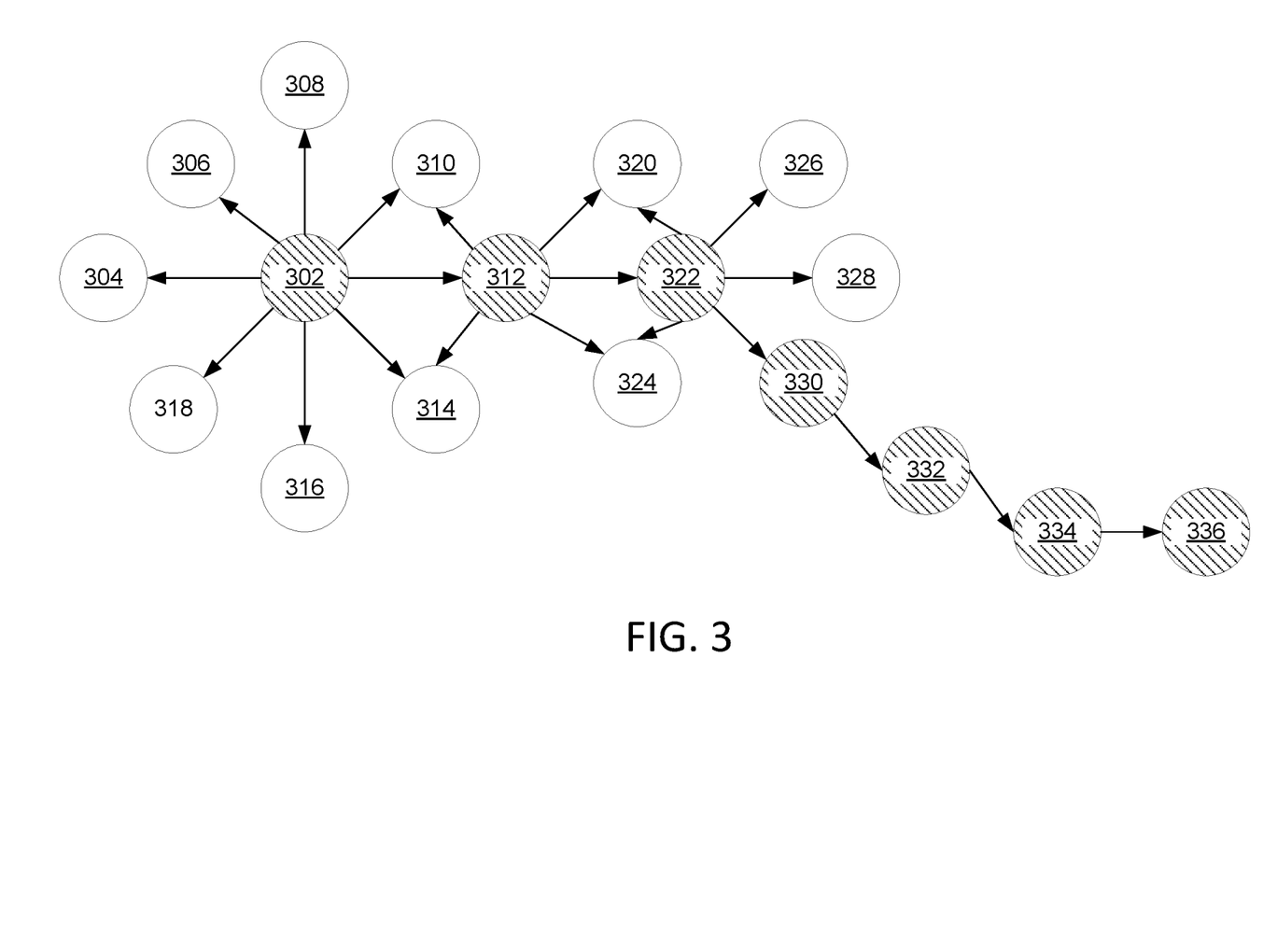
FIG. 3 illustrates a decision model for a tuning circuit in FIG. 2 to determine a parameter setting for a component of a receiver system in FIG. 2, according to one exemplary implementation.

FIG. 3 illustrates a decision model 300 for the tuning circuit 210 in FIG. 2 to determine an adjustment value for a component of the receiver system 208 in FIG. 2, according to one exemplary implementation. As discussed above, the tuning circuit 210 may receive a command from the measurement and correlation circuit 212 indicating an amount of change in the output signal at a defined frequency as compared to the test signal. When the tuning circuit 210 receives the command, the tuning circuit 210 may identify an initial adjustment value 302 for a component of the receiving system 208 to adjust the component and to compensate for the change in the output signal. The receiving system 208 may accordingly adjust the component by the adjustment value.

When the adjustment value does not fully compensate for the change in the output signal, the tuning circuit 210 may iteratively select subsequent adjustment values to further tune the component until the change in the output signal is compensated for. For example, the receiver system 208 may initially adjust the component by the adjustment value 302 and compensate for 90 percent of the change in the output signal. The tuning circuit 210 may then identify a second adjustment value 312 from among multiple possible subsequent adjustment values 304-318. In one example, the tuning circuit 210 may randomly select the second adjustment value 312 from among multiple possible subsequent adjustment values 304-318. In another example, the tuning circuit 210 may iteratively test one or more of the adjustment values and select the adjustment value that most fully compensates for change in the output signal. The second adjustment value 312 may be an increase in the initial adjustment value 302 by a defined amount. The receiver system 208 may further adjust the component by the adjustment value 312 and compensate for 92 percent of the change in the output signal. The tuning circuit 210 may iteratively select adjustment value 322 from among adjustment values 310, 314, 320, 322, and 324 and then select adjustment values 330, 332, 334, and 336 from among other adjustment values until the change in the output value is fully or most fully compensated for or is below a threshold level.

The number of the subsequent adjustment values is not intended to be limiting. For example, the tuning circuit 210 may iteratively select adjustment values to compensate for changes in the output signal caused by changes in an operating environment of the components of the receiver system 208. The iterative selection of adjustment values may increase an accuracy of the system 200 compensating for the changes and variations caused by the component of the receiving system 208. The iterative selection of adjustment values may also reduce an amount of time the receiver system 208 is calibrated during manufacturing and tested before the receiver system 208 may be used.

Figure 4:
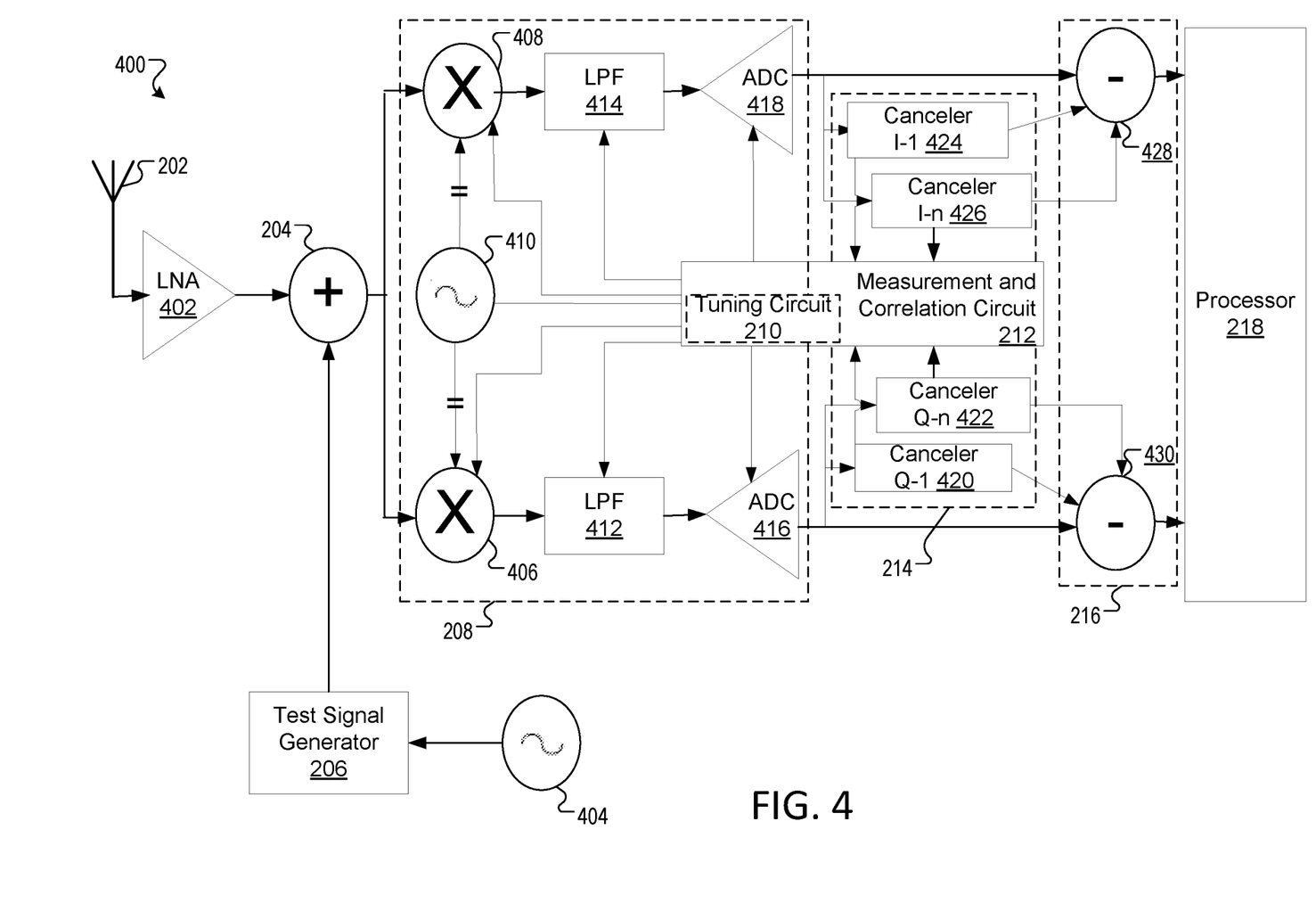
FIG. 4 illustrates a system with an in-phase/quadrature (I/Q) architecture to adjust a signal received at a radio device, according to one exemplary implementation.

FIG. 4 illustrates a system 400 with an in-phase/quadrature (I/Q) architecture to adjust a signal received at a radio device, according to one exemplary implementation. Some of the features in FIG. 4 are the same or similar to the some of the features in FIG. 2 as noted by same reference numbers, unless expressly described otherwise.

The system 400 may include the antenna 202, a low-noise amplifier (LNA) 402, the combiner 204, an oscillator 404, the test signal generator 206, the receiver system 208, the measurement and correlation circuit 212, the cancellation circuit 214, the adjustment circuit 216, and the processor 218.

The radio device may receive a signal by the antenna 202. The antenna 202 may be coupled to the LNA 402. The antenna 202 may send the received signal to the LNA 402. The LNA 402 may amplify the received signal. For example, when the received signal is a low-power signal, the LNA 402 may amplify the low-power signal without significantly degrading a signal-to-noise ratio of the received signal. In another implementation, mixers 406 and 408 may down convert the received signal to generate a baseband signal. The LNA 402 may be coupled to the combiner 204. The LNA 402 may send the amplified signal to the combiner 204. The combiner 204 may also be coupled to the test signal generator 206.

The oscillator 404 may generate a signal, such as a SIN signal or a COS signal. The oscillator 404 may be coupled to the test signal generator 206. The oscillator 404 may send the signal to the test signal generator 206. The test signal generator 206 may adjust the signal to generate a test signal(s) with a defined amplitude(s) at a given frequency(ies). The test signal generator 206 may send the test signal to the combiner 204. The combiner 204 may combine the received signal and the test signal to generate an input signal. The combiner 204 may also divide the input signal into two portions. The combiner 204 may be coupled to the receiver system 208. The combiner 204 may send the input signal to the receiver system 208.

The receiver system 208 may include in-phase/quadrature (I/Q) architecture with an in-phase signal path and a quadrature signal path. The quadrature signal path may include a mixer 406, an oscillator 410, a low pass filter (LPF) 412, an analog to digital converter (ADC) 416. The mixer 406 may be coupled to the combiner 204. The combiner 204 may send a portion of the input signal to the mixer 406. The mixer 406 may also be coupled to the oscillator 410 and the measurement and correlation circuit 212.

The mixer 406 may receive a signal from the oscillator 410. The mixer 406 may convert the input signal and the signal from the oscillator 410 to generate an aggregated signal. The mixer 406 may be coupled to the LPF 412. The LPF 412 may be a filter that passes a portion of the aggregated signal to the ADC 416 and attenuates the frequencies of the aggregated signal that exceed a threshold frequency range. The LPF 412 may be coupled to the ADC 416 and send the portion of the aggregated signal to the ADC 416. The ADC 416 may convert the aggregated signal from an analog signal to a digital signal.

The ADC 416 may be coupled to the cancellation circuit 214 and the adjustment circuit 216. The cancellation circuit 214 may include a set of quadrature cancelers 420-422 and a set of in-phase cancelers 424-426. The set of quadrature cancelers 420-422 and the set of in-phase cancelers 424-426 may be set to cancel real and imaginary portions of a signal at different frequencies. For example, as the test signal generator 206 generates signals at different frequencies, the cancelers in the set of quadrature cancelers 420-422 and the set of in-phase cancelers 424-426 may be tuned to cancel the different frequencies.

The ADC 416 may be coupled to the quadrature cancelers 420 through 422. The ADC 416 may send the digital signal to the quadrature cancelers 420 through 422. Each quadrature canceler 420 through 422 may be set to determine a cancellation value to change an amplitude of the output signal at different defined frequencies to remove the test signal and/or its products from the output signal. For example, the quadrature canceler 420 may be set to determine a cancellation value to change an amplitude of the output signal at a 10 MHz frequency to remove the test signal from the output signal at 10 MHz. The cancellation value may be a signal with an amplitude value for the adjustment circuit 216 to decrease the amplitude of the output signal by 20 dB at the 10 MHz frequency. In once example, the quadrature canceler 420 may be a Spur cancellation unit.

The quadrature canceler 420 may be coupled to the adjustment circuit 216. For example, the quadrature canceler 420 may be coupled to a quadrature adjustment circuit 430. The quadrature adjustment circuit 430 may increase or decrease an amplitude of the output signal at the given frequency by the cancellation value to generate a processed signal. In one example, when the cancellation value is 20 dB at 10 MHz, the quadrature adjustment circuit 430 may increase an amplitude of the output signal by 20 dB at 10 MHz. In another example, when the cancellation value is 10 dB at 10 MHz, the quadrature adjustment circuit 430 may decrease an amplitude of the output signal by 10 dB at 10 MHz. In this example, the quadrature cancelers 420-422 may generate signal components with magnitudes and phases equal to the test signals at defined frequencies and the quadrature adjustment circuit 430 may subtract the signal components from the output signal.

The quadrature adjustment circuit 430 may also be coupled to the ADC 416 and the other quadrature canceler 422. The quadrature adjustment circuit 430 may receive the digital signal from the ADC 416 and the cancellation values from each of the quadrature cancelers. The quadrature adjustment circuit 430 may adjust the digital signal to remove the test signals and/or their products from the digital signal. The quadrature adjustment circuit 430 may send the processed signal to the processor 218.

The quadrature cancelers 420 through 422 may be coupled to the measurement and correlation circuit 212. The quadrature cancelers 420 through 422 may send the cancellation values to the measurement and correlation circuit 212. The measurement and correlation circuit 212 may generate a change value that indicates the change in the output signal at the defined frequencies. The measurement and correlation circuit 212 may include the tuning circuit 210. The tuning circuit 210 may be coupled to the oscillator 410, the combiner 406, the LPF 412, and the ADC 416. The tuning circuit 210 may use the change value to determine an adjustment to make to one or more of the oscillator 410, the combiner 406, the LPF 412, or the ADC 416 to compensate for impairments caused by LNA 402, the mixer 406, the LPF 412, and the ADC 416.

In one example, the tuning circuit 210 may adjust a working current or voltage of the LNA 402, the mixer 406, the LPF 412, or the ADC 416. The in-phase signal path may include an LNA 402, a mixer 408, an LPF 414, an ADC 418, in-phase cancelers 424-426, an in-phase adjustment circuit 428, the processor 218, and the measurement and correlation circuit 212. The LNA 402, mixer 406, the LPF 412, the ADC 416, the in-phase cancelers 420-422, the in-phase adjustment circuit 430, the processor 218, and the measurement and correlation circuit 212 may perform the same functions as the equivalent quadrature components but for a real portion of the received signal.

In one implementation, the cancellation circuit 214, the adjustment circuit 216, and the measurement correlation circuit 212 may be hardware components that are current efficient. In another implementation, the cancellation circuit 214, the adjustment circuit 216, and the measurement correlation circuit 212 may be applications executed on a processor or processing logic.

Figure 5A:
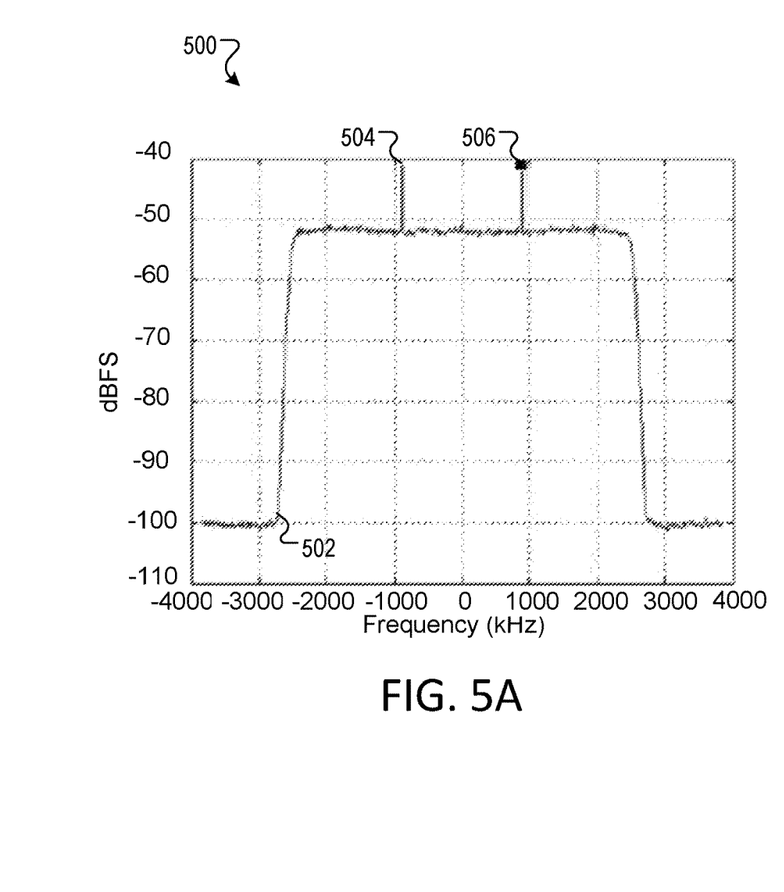
FIG. 5A illustrates a graph of an output signal with a first interference point and a second interference point, according to one exemplary implementation.

FIG. 5A illustrates a graph 500 of an output signal 502 with two products of second order interference points 504 and 506, according to one exemplary implementation. The interference points 504 and t 506 may be interferences caused by a component in an output signal generated by the receiver system 208.

Figure 5B:
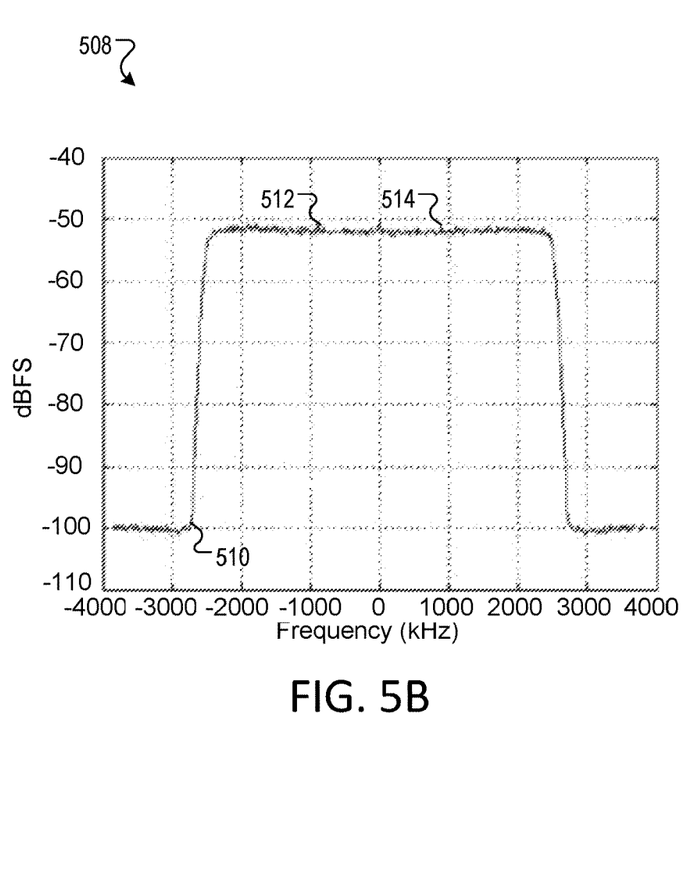
FIG. 5B illustrates a graph of a processed signal with a first cancellation point and a second cancellation point, according to one exemplary implementation.

FIG. 5B illustrates a graph 508 of a processed signal 510 with cancellation points 512 and 514, according to one exemplary implementation. As discussed above, a component of a receiver system 208 may be adjusted to reduce or eliminate interference caused by the component. For example, a mixer may be adjusted by a tuning circuit to remove interference at interference points 504 and 506 in the output signal 502 of FIG. 5A. When the adjustable parameter of the component is adjusted, the inference at the interference points 504 and 506 may be removed so that the processed signal 501 is substantially similar to a signal received at the antenna 202 in FIG. 2.

Figure 6:
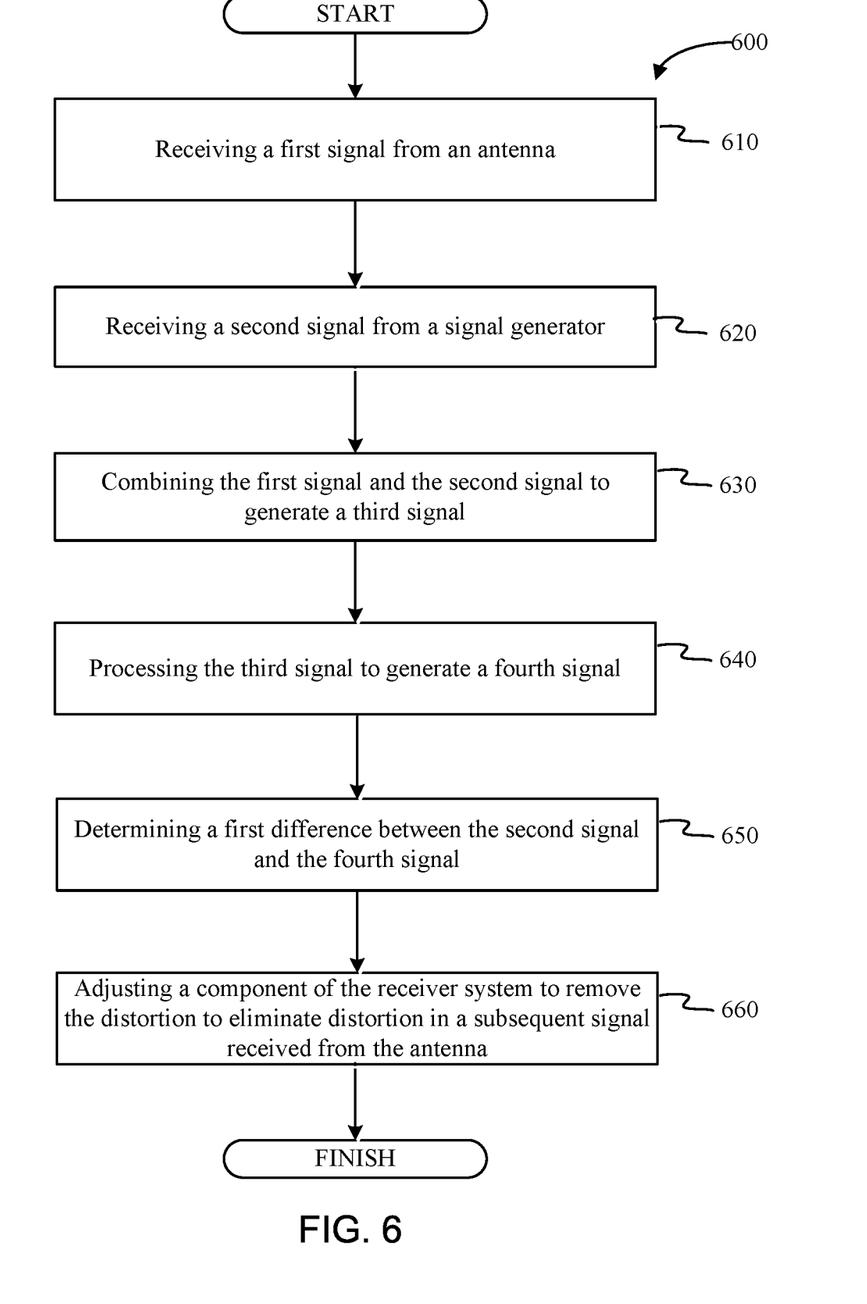
FIG. 6 illustrates a method for compensating the effect of distortion caused by a component in a receiver system, according to one exemplary implementation.

FIG. 6 illustrates a method 600 for compensating the effect of distortion caused by a component in a receiver system, according to one exemplary implementation. The method 600 may at least partially be performed by processing logic that includes hardware (e.g., circuitry, dedicated logic, a processing component, microcode, etc.), software (e.g., instructions executed by a processing device), firmware or a combination thereof. In one exemplary implementation, the method 600 may be performed by all or part of the mobile device 100 of FIG. 1. For example, the method 600 may be performed by the RF circuitry 106 or the front-end circuitry 108. In another exemplary implementation, the method 600 may be performed by all or part of the system 200 of FIG. 2.

Referring to FIG. 6, the method 600 begins at block 610 with receiving a first signal at a combiner from an antenna. The first signal may be an RF signal. At block 620, the combiner may receive a second signal from a signal generator. At block 630, the combiner may combine the first signal and the second signal to generate a third signal. At block 640, a receiver system may process the third signal to generate a fourth signal. At block 650, the receiver system may receive determine a difference between the second signal and the fourth signal. In one example, the difference indicates a distortion in the fourth signal. At block 660, the receiver system may adjust a component of the receiver system to remove the distortion to eliminate distortion in a subsequent signal received from the antenna.

While the present disclosure describes a number of exemplary implementations, those skilled in the art will appreciate numerous modifications and variations therefrom. It is intended that the appended claims cover all such modifications and variations as fall within the true spirit and scope of this present disclosure.

The following examples pertain to further exemplary implementations.

Example 1 is an apparatus including: 1) a receiver system to process a first tracking signal to generate a first output signal, wherein the first tracking signal comprises a first radio signal (RF) signal and a test signal, and wherein the processing of the first tracking signal introduces a distortion into the first output signal; and 2) a tuning circuit operatively coupled to the receiver system, the tuning circuit to determine a first adjustment value and send the first adjustment value to the receiver system, wherein the receiver system is to adjust a component of the receiver system using the first adjustment value to eliminate the distortion in a second RF signal that is caused by the component In Example 2, the apparatus of Example 1 further comprising a correlation circuit coupled to the receiver system, the correlation circuit to determine a first difference between the first output signal and the first test signal, wherein the first difference indicates the distortion in the first output signal and wherein the tuning circuit is to determine the first adjustment value in view of the first difference.

In Example 3, the apparatus of any one of Examples 1-2, further comprising: 1) an antenna to receive the first RF signal; and 2) a signal generator to generate the first test signal at a defined frequency.

In Example 4, the apparatus of any one of Examples 1-3, further comprising a cancellation circuit to adjust an amplitude and phase of the first tracking signal at a defined frequency to remove the first test signal and components of distortion products from the first output signal.

In Example 5, the apparatus of any one of Examples 1-4, wherein the first adjustment value indicates a current level or voltage level for the receiver system to supply to the component.

In Example 6, the apparatus of any one of Examples 1-5, wherein the first adjustment value indicates a current level or voltage level for the receiver system to supply to the component.

In Example 7, the apparatus of any one of Examples 1-6, further comprising a combiner to receive the first RF signal and the test signal and combine the first RF signal and the test signal to generate the first tracking signal.

In Example 8, the apparatus of any one of Examples 1-7, wherein: 1) the combiner is further to receive a second RF signal and combine the test signal and the second RF signal to generate a second tracking signal; 2) the receiver system is further to process the second tracking signal to generate a second output signal, wherein the processing causes a distortion in the second output signal; and 3) the tuning circuit is further to determine a second adjustment value and send the second adjustment value to the receiver system, wherein the receiver system is to adjust the component of the receiver system using the second adjustment value to eliminate distortion in a subsequent RF signal that is caused by the component.

In Example 9, the apparatus of any one of Examples 1-8, wherein the test signal is generated at a defined frequency to test for the distortion caused by the component of the receiver system.

In Example 10, the apparatus of any one of Examples 1-9, wherein the distortion is caused by an imperfection in the component that is dependent on an external variable, wherein the external variable comprises at least one of: a temperature of the component; a supply voltage level, a humidity level, an age of the component; or external radiation.

In Example 11, the apparatus of any one of Examples 1-10, wherein: 1) the combiner is further to divide the first tracking signal into an imaginary portion and a real portion; 2) the receiver system is further to process the imaginary portion of the first tracking signal and the real portion of the first tracking signal to generate the first output signal that includes an imaginary portion and a real portion; and 3) the tuning circuit is further to determine the first adjustment value in view of a first difference between the imaginary portion of the first output signal and the imaginary portion of the first test signal and a second difference between the real portion of the first output signal and the real portion of the first test signal.

Various exemplary implementations may have different combinations of the structural features described above. For instance, all optional features of the computing system described above may also be implemented with respect to the method or process described herein and specifics in the examples may be used anywhere in one or more exemplary implementations.

Example 12 is a system including: 1) a means for injecting a test signal into an RF signal to generate a tracking signal;

2) a means for processing the tracking signal to generate an output signal, wherein the output signal includes a distortion introduced into the output signal by a component of the means for processing the signal; and 3) a means for adjusting the component to remove the distortion in subsequent RF signals.

In Example 13, the system of Example 12, further comprising: 1) a means for receiving the RF signal; and 2) a means for generating the second signal at a defined frequency to test for distortion caused by the component.

In Example 14, the system of any one of Examples 12-13, wherein the distortion is interference in the output signal generated by the component.

In Example 15, the system of any one of Examples 12-14, further comprising: 1) a means for converting the output signal from an analog signal to a digital signal; and 2) a means for sending the output signal to a processor for signal processing.

Various embodiments can have different combinations of the structural features described above. For instance, all optional features of the computing system described above can also be implemented with respect to the method or process described herein and specifics in the examples can be used anywhere in one or more embodiments.

Example 16 is a method including: 1) receiving an RF signal from an antenna; 2) receiving a test signal from a signal generator; 3) combining the RF signal and the test signal to generate a tracking signal; 4) processing, by a receiver system, the tracking signal to generate an output signal; 5) determining a first difference between the test signal and the output signal, wherein the difference indicates a distortion in the output signal; and 6) adjusting a component of the receiver system to remove the distortion to eliminate distortion in a subsequent RF signal caused by the component.

In Example 17, the method of Example 16, further comprising: 1) receiving the subsequent RF signal from the antenna; and 2) adjusting the component to remove the distortion from the subsequent RF signal.

In Example 18, the method of any one of Examples 16-17, further comprising removing the test signal or a product of the test signal from the output signal.

In Example 19, the method of any one of Examples 16-18, further comprising sending the output signal to a RF processor for signal processing.

In Example 20, the method of any one of Examples 16-19, wherein the distortion is caused by an operating temperature of the component in the receiver system or an imperfection in the component.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of exemplary implementations, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and microarchitectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well-known components or methods, such as specific and alternative processor architectures, specific logic circuits/code for described algorithms, specific firmware code, specific interconnect operation, specific logic configurations, specific manufacturing techniques and materials, specific compiler exemplary implementations, specific expression of algorithms in code, specific power down and gating techniques/logic and other specific operational details of computer system have not been described in detail in order to avoid unnecessarily obscuring the present disclosure.

Instructions used to program logic to perform exemplary implementations of the disclosure can be stored within a storage element in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a microcontroller, associated with a non-transitory medium to store code adapted to be executed by the micro-controller. Therefore, a reference to a module, in one exemplary implementation, refers to the hardware, which is specifically configured to recognize and/or execute the code to be held in a non-transitory medium. Furthermore, in another exemplary implementation, use of a module refers to the non-transitory medium including the code, which is specifically adapted to be executed by the microcontroller to perform predetermined operations. And as can be inferred, in yet another exemplary implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one exemplary implementation, use of the term logic includes hardware, such as transistors, registers, or other hardware, such as processing component devices.

Use of the phrase 'configured to,' in one exemplary implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, operatively coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one operatively coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one exemplary implementation, refers to some apparatus, logic, hardware, and/or element designed in such a way to enable use of the apparatus, logic, hardware, and/or element in a specified manner. Note as above that use of to, capable to, or operable to, in one exemplary implementation, refers to the latent state of an apparatus, logic, hardware, and/or element, where the apparatus, logic, hardware, and/or element is not operating but is designed in such a manner to enable use of an apparatus in a specified manner.

The exemplary implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform exemplary implementations of the disclosure may be stored within a storage element in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one exemplary implementation" or "an exemplary implementation" means that a particular feature, structure, or characteristic described in connection with the exemplary implementation is included in at least one exemplary implementation of the present disclosure. Thus, the appearances of the phrases "in one exemplary implementation" or "in an exemplary implementation" on "in some exemplary implementations" in various places throughout this specification are not necessarily all referring to the same exemplary implementation. Furthermore, the particular features, structures, or characteristics may be combined in any suitable manner in one or more exemplary implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of exemplary implementation and other exemplary language does not necessarily refer to the same exemplary implementation or the same example, but may refer to different and distinct exemplary implementations, as well as potentially the same exemplary implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "generating," "optimizing," "associating," "obtaining," "identifying," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an exemplary implementation" or "one exemplary implementation" or "an exemplary implementation" or "one exemplary implementation" throughout is not intended to mean the same exemplary implementation or exemplary implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
a receiver system to process a first tracking signal to generate a first output signal, wherein the first tracking signal comprises a first radio frequency (RF) signal and a test signal, the test signal venerated based on a prior version of the first output signal, and wherein processing of the first tracking signal introduces a distortion into the first output signal; and
a tuning circuit operatively coupled to the receiver system, the tuning circuit to determine a first adjustment value and send the first adjustment value to the receiver system, the first adjustment value generated based on a change in the first output signal detected at a defined frequency of the test signal, wherein the receiver system is to adjust a component of the receiver system using the first adjustment value to cancel the distortion in a second RF signal that is caused by the component.

2. The apparatus of claim 1, further comprising a correlation circuit coupled to the receiver system, the correlation circuit to determine a first difference between the first output signal and the test signal at the defined frequency, wherein the first difference indicates the distortion in the first output signal, and wherein the tuning circuit is to determine the first adjustment value in view of the first difference.

3. The apparatus of claim 1, further comprising:
an antenna to receive the first RF signal; and
a signal generator to generate the test signal at the defined frequency.

4. The apparatus of claim 1, further comprising a cancellation circuit to adjust an amplitude and phase of the first tracking signal at the defined frequency to cancel the test signal and components of distortion products from the first output signal.

5. The apparatus of claim 1, further comprising a cancellation circuit to adjust an amplitude and phase of the first tracking signal at the defined frequency to remove distortion products of the test signal from the first output signal.

6. The apparatus of claim 1, wherein the first adjustment value indicates a current level or voltage level for the receiver system to supply to the component.

7. The apparatus of claim 1, further comprising a combiner to receive the first RF signal and the test signal and combine the first RF signal and the test signal to generate the first tracking signal.

8. The apparatus of claim 7; wherein:
the combiner is further to receive a third RF signal and combine the test signal and the third RF signal to generate a second tracking signal;
the receiver system is further to process the second tracking signal to generate a second output signal, wherein processing the second tracking signal causes a distortion in the second output signal; and
the tuning circuit is further to determine a second adjustment value and send the second adjustment value to the receiver system, wherein the receiver system is to adjust the component of the receiver system using the second adjustment value to cancel a distortion in a subsequent RF signal that is caused by the component.

9. The apparatus of claim 7, wherein:
the combiner is further to divide the first tracking signal into an imaginary portion and a real portion;
the receiver system is further to process the imaginary portion of the first tracking signal and the real portion of the first tracking signal to generate the first output signal that includes an imaginary portion and a real portion; and
the tuning circuit is further to determine the first adjustment value in view of a first difference between the imaginary portion of the first output signal and the imaginary portion of the test signal and a second difference between the real portion of the first output signal and the real portion of the test signal.

10. The apparatus of claim 1, wherein the test signal is generated at the defined frequency to test for the distortion caused by the component of the receiver system.

11. The apparatus of claim 1, wherein the distortion is caused by an imperfection in the component that is dependent on an external variable, wherein the external variable comprises at least one of: a temperature of the component; a supply voltage level, a humidity level, an age of the component; or external radiation.

12. A system comprising:
a component;
means for injecting a test signal into an RE signal to generate a tracking signal, the tracking signal comprising a radio frequency (RE) signal and a test signal;
means for processing the tracking signal to generate an output signal, wherein the output signal includes a distortion introduced into the output signal by the component, and wherein the test signal is generated based on a prior version of the output signal; and
means for adjusting the component to remove the distortion in a subsequent RE signal using an adjustment value generated based on a change in the output signal detected at a defined frequency of the test signal.

13. The system of claim 12, further comprising:
means for receiving the RF signal; and
means for generating a second signal at a defined frequency to test for distortion caused by the component.

14. The system of claim 12, wherein the distortion is interference in the output signal generated by the component.

15. The system of claim 12, further comprising:
means for converting the output signal from an analog signal to a digital signal; and
means for sending the digital signal to a processor for signal processing.

16. A method comprising:
receiving a radio frequency (RF) signal from an antenna;
receiving a test signal from a signal generator;
combining the RF signal and the test signal to generate a tracking signal;

processing, by a receiver system, the tracking signal to generate an output signal, wherein the test signal is generated based on a prior version of the output signal;

determining a first difference between the test signal and the output signal, wherein the first difference indicates a distortion in the output signal; and adjusting a component of the receiver system using an adjustment value to remove the distortion to cancel a distortion in a subsequent RF signal caused by the component, the adjustment value generated based on a change in the output signal detected at a defined frequency of the test signal.

17. The method of claim 16, further comprising:
receiving the subsequent RF signal from the antenna; and
adjusting the component to remove the distortion from the subsequent RF signal.

18. The method of claim 16, further comprising removing the test signal or a product of the test signal from the output signal.

19. The method of claim 16, further comprising sending the output signal to a RE processor for signal processing.

20. The method of claim 16, wherein the distortion is caused by at least one of an operating temperature of the component in the receiver system or an imperfection in the component.

* * * * *

UNITED STATES PATENT AND TRADEMARK OFFICE
CERTIFICATE OF CORRECTION

PATENT NO. : 10,972,140 B2  
APPLICATION NO. : 16/490011  
DATED : April 6, 2021  
INVENTOR(S) : Itkin et al.

Page 1 of 1

It is certified that error appears in the above-identified patent and that said Letters Patent is hereby corrected as shown below:

In the Claims

In Column 17, Line 28, in Claim 1, delete "venerated" and insert --generated-- therefor In Column 18, Line 1, in Claim 8, delete "claim 7;" and insert --claim 7,-- therefor In Column 18, Line 39, in Claim 12, delete "RE" and insert --RF-- therefor In Column 18, Line 41, in Claim 12, delete "(RE)" and insert --(RF)-- therefor In Column 18, Line 48, in Claim 12, delete "RE" and insert --RF-- therefor In Column 19, Line 21, in Claim 19, delete "RE" and insert --RF-- therefor Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*